United States Patent
Stach et al.

(10) Patent No.: US 7,340,076 B2
(45) Date of Patent: Mar. 4, 2008

(54) DIGITAL WATERMARKS FOR UNMANNED VEHICLE NAVIGATION

(75) Inventors: John Stach, Tualatin, OR (US); Trent J. Brundage, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 828 days.

(21) Appl. No.: 10/418,025

(22) Filed: Apr. 16, 2003

(65) Prior Publication Data

US 2004/0032972 A1    Feb. 19, 2004

Related U.S. Application Data

(63) Continuation-in-part of application No. 10/218,021, filed on Aug. 12, 2002, now Pat. No. 6,993,152, and a continuation-in-part of application No. 10/074,680, filed on Feb. 11, 2002, now abandoned, which is a continuation-in-part of application No. 09/854,408, filed on May 10, 2001.

(60) Provisional application No. 60/350,505, filed on Jan. 18, 2002.

(51) Int. Cl.
*G06K 9/00* (2006.01)
(52) U.S. Cl. .................... 382/100; 382/176
(58) Field of Classification Search ............ 382/100, 382/232, 284, 291; 701/28, 207; 713/176; 380/287, 51, 54, 55; 283/72, 85, 113
See application file for complete search history.

(56) References Cited

U.S. PATENT DOCUMENTS

| | | | |
|---|---|---|---|
| 4,403,907 A | 9/1983 | Koller et al. | |
| 4,453,882 A | 6/1984 | Mang | |
| 4,564,326 A | 1/1986 | Roberts et al. | |
| 4,601,382 A | 7/1986 | Roberts et al. | |
| 4,696,715 A | 9/1987 | Bahr | |
| 4,807,031 A | 2/1989 | Broughton et al. | |
| 4,860,438 A | 8/1989 | Chen | |
| 5,113,445 A | 5/1992 | Wang | |
| 5,175,425 A | 12/1992 | Spratte et al. | |
| 5,237,622 A | 8/1993 | Howell | |
| 5,247,844 A | 9/1993 | Howell | |
| 5,345,831 A | 9/1994 | Sandrock | |
| 5,390,283 A | 2/1995 | Eshelman et al. | |
| 5,421,697 A | 6/1995 | Ostwald | |
| 5,449,265 A | 9/1995 | Legrady et al. | |
| 5,482,198 A | 1/1996 | Kohn | |
| 5,499,306 A * | 3/1996 | Sasaki et al. | 382/291 |
| 5,509,191 A | 4/1996 | Best | |

(Continued)

FOREIGN PATENT DOCUMENTS

WO    WO01/75629    10/2001

(Continued)

OTHER PUBLICATIONS

U.S. Appl. No. 09/343,104, filed Jun. 29, 1999, Rodriguez et al.

(Continued)

*Primary Examiner*—Phuoc Tran

(57) ABSTRACT

Digital watermarks embedded in objects enable watermark readers in vehicles to identify the objects and determine their orientation and location for use in navigation.

22 Claims, 2 Drawing Sheets

U.S. PATENT DOCUMENTS

| | | | |
|---|---|---|---|
| 5,524,947 | A | 6/1996 | Mojden et al. |
| 5,613,632 | A | 3/1997 | Kohn |
| 5,636,292 | A | 6/1997 | Rhoads |
| 5,640,193 | A | 6/1997 | Wellner |
| 5,654,204 | A | 8/1997 | Anderson |
| 5,748,783 | A | 5/1998 | Rhoads |
| 5,754,981 | A | 5/1998 | Veeneman et al. |
| 5,768,759 | A | 6/1998 | Hudson |
| 5,790,703 | A | 8/1998 | Wang |
| 5,809,160 | A | 9/1998 | Powell et al. |
| 5,822,436 | A | 10/1998 | Rhoads |
| 5,832,119 | A | 11/1998 | Rhoads |
| 5,835,639 | A | 11/1998 | Honsinger et al. |
| 5,841,978 | A | 11/1998 | Rhoads |
| 5,859,920 | A | 1/1999 | Daly et al. |
| 5,862,260 | A | 1/1999 | Rhoads |
| 5,865,487 | A | 2/1999 | Gore et al. |
| 5,925,835 | A | 7/1999 | Solanki et al. |
| 5,949,055 | A | 9/1999 | Fleet et al. |
| 6,031,914 | A | 2/2000 | Tewfik et al. |
| 6,039,805 | A | 3/2000 | Davis et al. |
| 6,064,759 | A | 5/2000 | Buckley |
| 6,078,700 | A | 6/2000 | Sarachik |
| 6,098,057 | A | 8/2000 | Dlugos |
| 6,142,376 | A | 11/2000 | Cherry |
| 6,151,406 | A | 11/2000 | Chang |
| 6,153,508 | A | 11/2000 | Harvey |
| 6,165,885 | A | 12/2000 | Gaynes |
| 6,173,750 | B1 | 1/2001 | Davis |
| 6,174,171 | B1 | 1/2001 | Fu |
| 6,222,940 | B1 | 4/2001 | Wenzel |
| 6,226,399 | B1 | 5/2001 | Robinson |
| 6,282,528 | B1 | 8/2001 | Schaffer et al. |
| 6,311,214 | B1 | 10/2001 | Rhoads |
| 6,366,680 | B1 | 4/2002 | Brunk et al. |
| 6,389,055 | B1 | 5/2002 | August et al. |
| 6,400,996 | B1 | 6/2002 | Hoffberg et al. |
| 6,415,977 | B1 | 7/2002 | Rumsey |
| 6,510,234 | B1 | 1/2003 | Cox et al. |
| 6,512,835 | B1 | 1/2003 | Numao et al. |
| 6,542,933 | B1 | 4/2003 | Durst, Jr. et al. |
| 6,570,996 | B1 | 5/2003 | Linnartz |
| 6,574,609 | B1 | 6/2003 | Downs et al. |
| 6,614,914 | B1 | 9/2003 | Rhoads et al. |
| 6,681,028 | B2 | 1/2004 | Rodriguez et al. |
| 6,700,994 | B2 * | 3/2004 | Maes et al. ............ 382/100 |
| 6,709,336 | B2 | 3/2004 | Siegel et al. |
| 6,735,324 | B1 | 5/2004 | McKinley et al. |
| 6,737,957 | B1 | 5/2004 | Petrovic et al. |
| 6,759,228 | B2 | 7/2004 | Takaiwa et al. |
| 6,769,228 | B1 | 8/2004 | Mahar |
| 6,947,571 | B1 | 9/2005 | Rhoads et al. |
| 6,993,152 | B2 | 1/2006 | Patterson et al. |
| 2001/0001854 | A1 | 5/2001 | Schena et al. |
| 2001/0011276 | A1 | 8/2001 | Durst et al. |
| 2001/0047426 | A1 | 11/2001 | Hunter |
| 2002/0049967 | A1 | 4/2002 | Hasletine |
| 2002/0118394 | A1 | 8/2002 | McKinley et al. |
| 2002/0133818 | A1 | 9/2002 | Rottger |
| 2002/0141310 | A1 | 10/2002 | Stephany et al. |
| 2002/0147910 | A1 | 10/2002 | Brundage et al. |
| 2002/0153661 | A1 | 10/2002 | Brooks |
| 2002/0169962 | A1 | 11/2002 | Brundage et al. |
| 2003/0021439 | A1 * | 1/2003 | Lubin et al. ............ 382/100 |
| 2003/0037075 | A1 | 2/2003 | Hannigan et al. |
| 2003/0083890 | A1 | 5/2003 | Duncan et al. |
| 2004/0032972 | A1 | 2/2004 | Stach et al. |
| 2004/0128512 | A1 | 7/2004 | Sharma et al. |
| 2004/0162981 | A1 | 8/2004 | Wong |
| 2004/0260424 | A1 | 12/2004 | Mahar |
| 2006/0056707 | A1 | 3/2006 | Suomela et al. |
| 2006/0223507 | A1 | 10/2006 | Kawamoto |

FOREIGN PATENT DOCUMENTS

WO     WO02/03328     1/2002

OTHER PUBLICATIONS

Alattar, "Smart Images' Using Digimarc's Watermarking Technology," Proc. IS&T/SPIE's 12th International Symposium on Electronic Imaging, vol. 3971, No. 25, Jan. 2000, pp. 264-273.

IBM Research Disclosure No. 410129, Universal Interactive Device, Jun. 1998, 2 pages.

Sharma et al., "Practical Challenges for Digital Watermaking Applications," Proc. IEEE Workshop on Multimedia Signal Processing, Cannes, France, Oct. 2001, 10 pages.

Stach et al., "On the use of web cameras for watermark detection," Proc. SPIE Electronic Imaging 2002, Security and Watermarking of Multimedia Content IV, San Jose, CA, Jan. 2002, pp. 611-620.

Arai, "PaperLink: A Technique for Hyperlinking from Real Paper to Electronic Content," CHI 97, Mar. 22-27 1997, 8 pages.

Arai et al., Retrieving Electronic Documents with Real-World Objects on InteractiveDESK, Nov. 14, 1995, UIST '95, pp. 37-38.

Arai et al., "InteractiveDESK: A Computer-Augmented Desk Which Responds to Operations on Real Objects," CHI '95 Mosaic of Creativity, May 5-11 1995,-Nov. 1995, pp. 141-142.

Barrett, "Informative Things: How to Attach Information to the Real World," ACM Symposium on User Interface Software and Technology, Nov. 1, 1998.

Bloomberg, Embedding Digital Data on Paper in Iconic Text, SPIE, vol. 3027, pp. 67-80, 1997.

Diego López de Ipina, "TRIP: A Distributed Vision-Based Sensor System", Ph.D. 1st Year report, LCE, Cambridge University Engineering Department, UK. Aug. 31, 1999.

Ljungstrand et al., "WebStickers: Using Physical Tokens to Access, Manage and Share Bookmarks to the Web," DARE 2000, Apr. 12, 2000, 9 pages.

Rekimoto et al., "CyberCode: Designing Augmented Reality Environments with Visual Tags," DARE 2000, Apr. 12, 2000, 10 pages.

Rekimoto et al., "Augment-able Reality: Situation Communication Through Physical and Digital Spaces," Proc. of 2d Int. Symp. on Wearable Computers, Oct. 1998.

Want et al, "Bridging Physical and Virtual Worlds with Electronic Tags," CHI 99, May 15, 1999.

Final Rejection dated Jul. 1, 2005 from U.S. Appl. No. 09/854,408.

Appeal Brief dated Jan. 3, 2006 from U.S. Appl. No. 09/854,408.

Examiner's Answer dated Mar. 21, 2006 from U.S. Appl. No. 09/854,408.

* cited by examiner

DIGITAL WATERMARKS FOR UNMANNED VEHICLE NAVIGATION

RELATED APPLICATION DATA

This application is a continuation in part of U.S. application Ser. No. 10/218,021, filed Aug. 12, 2002 (published as US 2003-0053654), now U.S. Pat. No. 6,993,152, and U.S. application Ser. No. 10/074,680, filed Feb. 11, 2002 (published as 2002-0136429), abandoned, which claims the benefit of Ser. No. 60/350,505, filed Jan. 18, 2002. This application is also a continuation in part of U.S. application Ser. No. 09/854,408, filed May 10, 2001 (Published as US 2002-0169962).

This application is also related to Ser. No. 09/833,013, filed Apr. 10, 2001 (published as US 2002-0147910).

The above applications and publications are hereby incorporated by reference.

TECHNICAL FIELD

The invention relates to digital watermarking, machine vision, and automated navigation using machine reading of digital watermark signals on physical objects for identifying objects and navigating around the objects.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881, now U.S. Pat. No. 6,614,914, and U.S. Pat. No. 6,122,403, which are hereby incorporated by reference.

U.S. Patent Application Publication 2003-0053654 discloses a form of marking of physical objects to convey location information for navigation of aircraft. Also, U.S. patent Publication 2002-0169962 describes a form of digital watermarking on physical objects to convey orientation and location information used in controlling robots. This disclosure incorporates these documents and describes embedding of information in objects that enables unmanned vehicles to identify the objects and determine their orientation and location relative to the objects for use in navigation.

The invention provides methods, systems, and related software for automated navigation. One aspect is a method for automated navigation. The method captures an image scan of a digital watermark on an object. It extracts orientation and location information of an image sensor relative to the object from the digital watermark. It performs object identification based on auxiliary information carried in the digital watermark. Finally, it uses the orientation, location and object identification information to control movement of a vehicle.

Further features will become apparent with reference to the following detailed description and accompanying drawings.

DETAILED DESCRIPTION

This description details a system for vehicle navigation using digital watermark signals that enable watermark readers on the vehicle to identify the objects and determine their position and orientation relative to the objects. Parts of this system can be adapted for a variety of machine vision applications, including for example, autonomous navigation and mechatronics (e.g., automated hospital carts, warehouse robots, intelligent highways for navigation of passenger/commercial vehicles, consumer appliances, etc.), robotic handling (pick & place, assembly, packing), image registration for multisensor vision systems, industrial inspection systems (defects, quality assurance, etc.), calibration (optical systems, orientation, surfaces), surveillance (vehicles, multisensor systems). As such, the system described in this section is merely one example of how the digital watermark may be used in machine vision applications.

Figure 1:
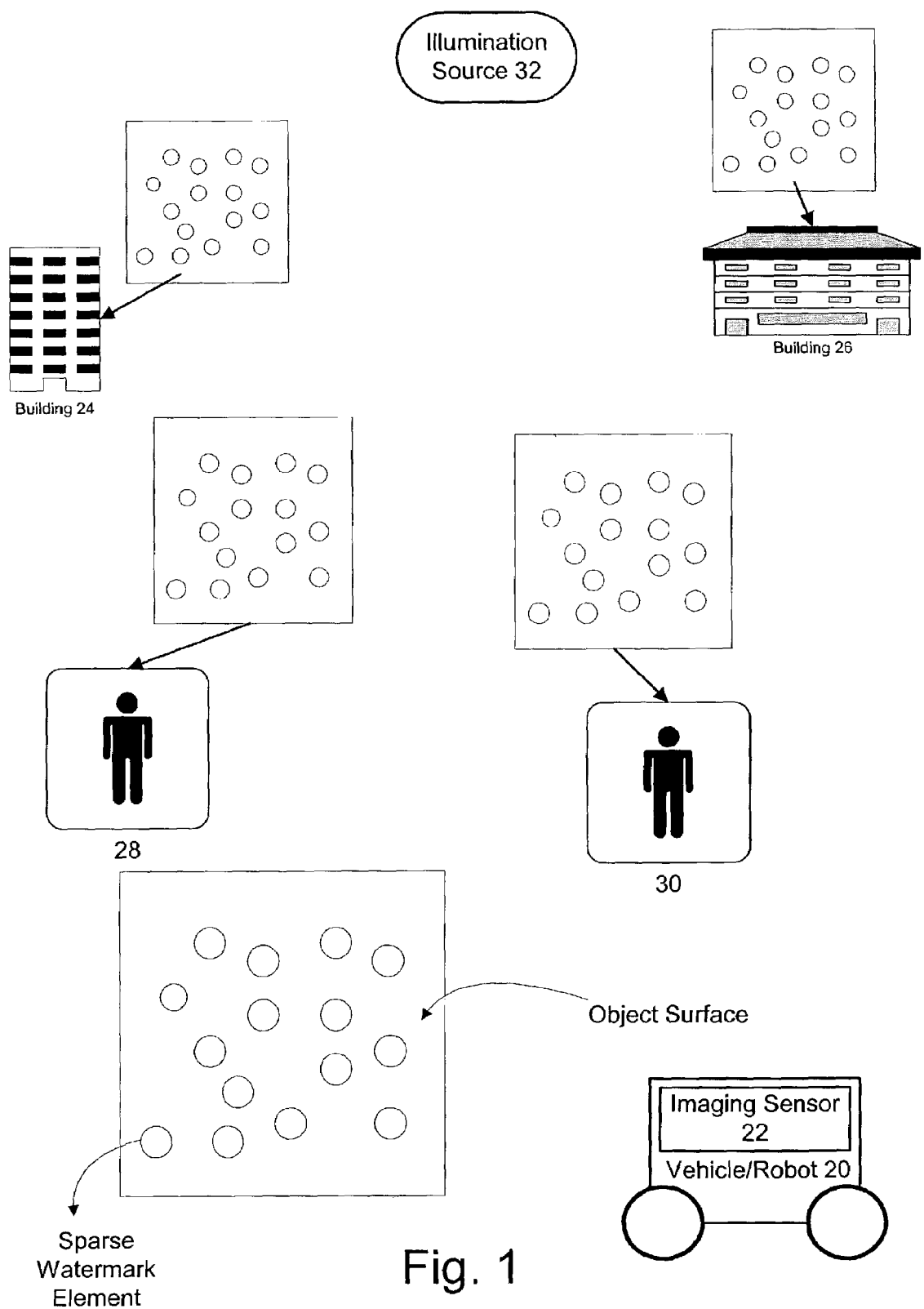
FIG. 1 is diagram illustrating an example of a navigation system including digitally watermarked objects enabling vehicles to identify objects and navigate around them.

FIG. 1 is diagram illustrating an example of a navigation system including digitally watermarked objects enabling vehicles to identify objects and navigate around them. The system includes one or more vehicles 20 equipped with imaging sensors 22 for capturing images of watermarked objects. These objects include stationary objects, such as buildings 24, 26 and ground/floor surfaces, as well as moving objects, such as other vehicles and personnel 28, 30. The objects are illuminated by an illumination source 32. This illumination source may be part of the vehicle 20 or separate. It may be a man-made source or natural (e.g., the sun). The illumination source may originate from the same direction as the sensor, and operate in conjunction with the sensor to image a marked object (e.g., as in the case of LADAR where a laser scans the target object). Alternatively, the light source or sources may be distributed throughout the environment or located on marked objects.

A wide variety of imaging sensors may be used in the system. These include, for example, Radio Frequency (RF) imaging, radar, microwave imaging, LADAR (including laser radar or lidar), ultraviolet imaging, infrared imaging, X-ray imaging, magnetic imaging (e.g., MRI), etc.

In this particular example, the marked objects include a form of digital watermark called a sparse digital watermark. The sparse digital watermark includes a collection of sparse watermark elements spread over all or some portion of the object surface.

The digital watermark can be embedded in a host image on the object such that it blends in with ordinary appearance of the object and is substantially imperceptible. Alternatively, the digital watermark may form an unobtrusive image structure, such as a background texture, that is visible, but does not interfere with the visual appearance of the object, is aesthetically pleasing, and is not obvious to human viewers that it carries any information.

For more information about creating digital watermark signals, including watermarks hidden in images or forming unobtrusive graphical designs, logos or textures, see the patent documents incorporated by reference above.

Figure 2:
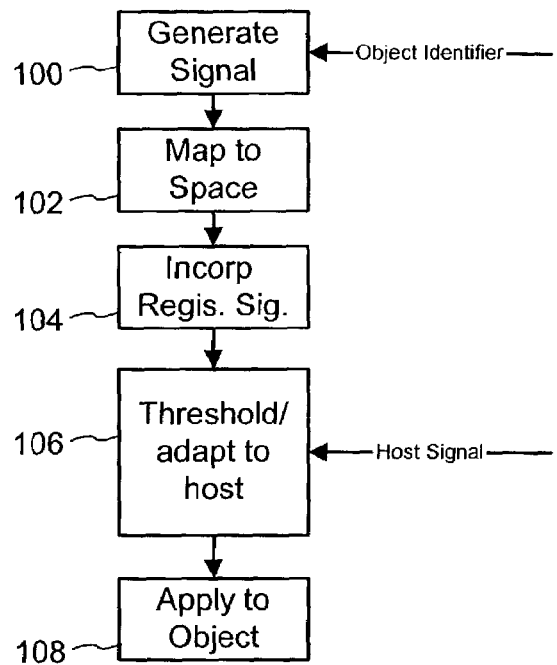
FIG. 2 is a flow diagram illustrating a method for applying a form of digital watermark signal onto a physical object.

FIG. 2 is a flow diagram illustrating a method for applying a form of digital watermark signal onto a physical object. This process is similar to digital watermark generation of certain embodiments described in U.S. application Ser. No. 09/503,881, now U.S. Pat. No. 6,614,914, and U.S. Pat. No. 6,122,403. In physical object marking for machine vision applications, there is often greater flexibility in designing the structure of the digital watermark signal because there is flexibility in the graphic design or appearance of the object surface, and the digital watermark need not be hidden in an image on the object as long as it does not interfere or conflict with other information or visual signals on the object. Instead, the signal can be designed to have a particular, unobtrusive style and structure, such as a graphic or background pattern. In one implementation, the structure of the signal appears as collection of sparse elements, but the signal may also be formed of other structures (e.g., different graphical shapes and sizes, different materials (such as materials with a differential cooling rate for IR detection), etc.)

The digital watermark signal carries a message shown as input to block 100 of the signal generation process. This message may include one or more fixed and variable parts. The fixed parts can be used to facilitate detection, geometric registration, and avoid false positives. The variable parts can carry variety of information, such as unique object identifiers (e.g., serving to index relating data in a database), authentication information (e.g., encrypted messages) to confirm that the object is a reliable source for navigation information, and error detection information computed as a function of the other message elements (e.g., a CRC check).

The signal generator block 100 of FIG. 2 performs error correction coding on the message to make it more robust. Examples include block codes (e.g., BCH codes), convolutional codes, turbo codes, M-ary modulation, and combinations of these coding methods (e.g., concatenated codes). Next, the signal generator transforms the error correction coded message with a carrier signal. One example is to spread it over a pseudorandom sequence through multiplication, XOR, or convolution. For example, each element of the error correction coded signal is spread over N corresponding elements of the carrier signal.

As part of the signal generation process, the watermark signal generator maps the elements of the signal to spatial locations of a target object (as shown in block 102). These locations form a tiled pattern of rectangular arrays or some other geometric pattern. This mapping may be used to structure the digital watermark signal into a pattern of blocks or other shapes that produce detectable energy peaks in the convolution, autocorrelation, frequency (e.g., FFT magnitude) or some other transform domain. These detectable energy peaks may be used to incorporate a geometric registration signal into the watermark signal as shown in block 104. Further, by replicating the auxiliary signal over this pattern, the repetitions inherent in this process can be used to enhance the robustness of the message (as a form of repetition coding that is exploited in the reader), and make the message detectable in small image portions captured of the object where it is repeated (e.g., robust to cropping, occlusion by other objects and personnel).

An additional geometric registration signal may be formed with the digital watermark signal at this stage. One example is addition of a signal that appears to be random (e.g., has a collection of components with pseudorandom phase relative to each other) and has detectable registration peaks in a transform domain, such as a spatial frequency domain, convolution domain and/or correlation domain. For more on this type of signal, see U.S. Pat. No. 6,122,403 and U.S. application Ser. No. 09/503,881, now U.S. Pat. No. 6,614,914, incorporated above.

At this point, the watermark signal comprises an array of binary or multilevel values (i.e. more than two binary states) at each spatial location. For the sake of explanation, we will refer to these locations as embedding locations. The locations of the sparse watermark elements in FIG. 1 are one example of embedding locations. If the signal is multilevel, it may be thresholded to generate a binary signal if desired as shown in block 106. For example, in the case of a sparse digital watermark, a multilevel digital watermark, including auxiliary message and registration information, is thresholded to form a sparse array of watermark elements, where location of a sparse watermark element represents part of the input signal that is greater than the threshold and absence of a sparse watermark element represents part of the input signal that is less than the threshold.

As an alternative, the process may adaptively embed the watermark signal into a host image by adjusting the watermark signal according to a human visual system modeling of the host image. In either case, the result of block 106 is an image carrying the digital watermark signal.

This image is formed on the surface of a corresponding object as shown in block 108. This image formation process may be performed in a variety of ways, depending on the form of sensor and illumination used in the system. Examples include printing the image on structures that are then adhered to the objects, printing or painting the image directly on the objects, constructing an array of materials or objects corresponding to the digital watermark signal at the desired embedding locations, etc. This digital watermark signal can be read by detecting the difference in sensed value between an embedding location and its neighboring locations. Examples of the attribute include luminance, IR energy, UV energy, RF energy, microwave energy, etc. These attributes may be measured when illuminated by a corresponding illumination source or may be naturally emitting (such as IR energy due to differential cooling rates of different types of materials used to represent a watermark element and its neighboring elements). This attribute provides a great deal of flexibility in the type material or attribute used to represent elements in the digital watermark signal at the embedding locations, as well as the method of application of the signal to the object, and the types of sensor and illumination used to detect the watermark signal elements.

The material used to carry the digital watermark at embedding locations have measurable values, such as luminance, intensity, or some other characteristic, relative to other elements on the object surface. Combinations of these characteristics may be used to read the digital watermark signal in varying lighting and ambient conditions, such as inclement weather, smoke, dirt, water, etc. In addition, combinations of these features may be used to represent multiple digital watermark signal states at the embedding locations or multiple different layers of embedded registration and auxiliary message carrying signals.

Figure 3:
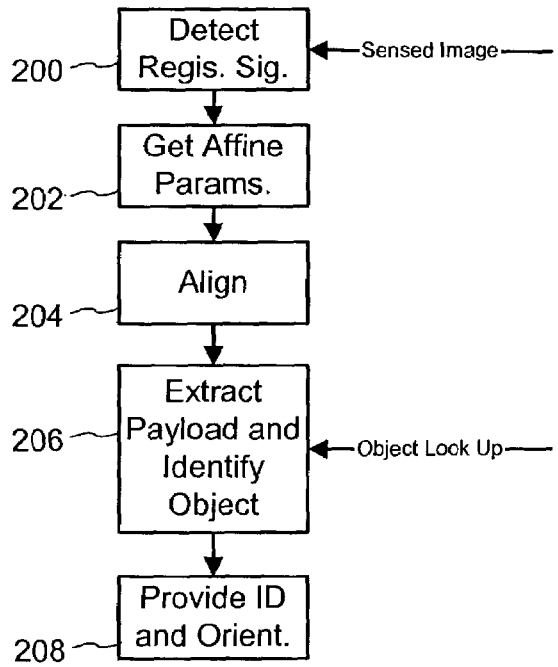
FIG. 3 is a flow diagram illustrating a method for reading a digital watermark on an object and determining orientation, location and object identification from the digital watermark.

FIG. 3 is a flow diagram illustrating a method for reading a digital watermark on an object and determining orientation, location and object identification from the digital watermark. The process of reading the digital watermark from an object starts with capture of an image of the object, which is shown as input to block 200 of FIG. 3. The nature of this image (e.g., derived from visible light scan, RF scan, radar scan, laser radar scan, UV scan, IR scan, or some combination thereof) varies with the implementation.

The process of extracting orientation and embedded auxiliary information from the image is illustrated in blocks 200 to 206. A digital watermark reader in the vehicle begins by detecting the registration signal of the digital watermark. For example, it detects transform domain peaks of the registration signal, and correlates them with a known pattern to calculate rotation, scale and translation. Examples of this process are described in U.S. application Ser. No. 09/503, 881, now U.S. Pat. No. 6,614,914, and U.S. Pat. No. 6,122,403, but the system is not limited to these approaches.

The detection of the registration signal provides affine transformation parameters, including rotation, scale, differential scale or shear, and translation as shown in block 202. These parameters represent the relative orientation and location between the sensor on the vehicle and the target object. This data is used to help the vehicle navigate around the object, and to register the image so that the auxiliary message payload can be extracted. This latter function of aligning the scanned image is depicted in block 204. Using the affine parameters, the reader compensates for the geometric distortion and determines the proper reference coordinate system for extracting embedded data from the embedding locations in the scanned image.

Next, the reader extracts the auxiliary message payload and uses it to identify the object as shown in block 206. First, the reader estimates the value of the watermark message signal elements at embedding locations. The reader looks at the synchronized array of image values and estimates the value of the auxiliary signal at each embedding location. For example, in the case where the auxiliary signal is embedded by adjusting the luminance up or down relative to neighboring locations, the reader predicts the value of the auxiliary signal element by comparing the luminance of the embedding location of interest with its neighbors. As noted above, attributes other than luminance may be used to carry information.

Next, the reader performs the inverse of the transform with the carrier to get estimates of the error correction encoded elements. In the case of a spreading carrier, the reader accumulates the contributions of the auxiliary signal estimates from the N embedding locations to form the estimate of the error correction encoded element. The reader then performs error correction decoding on the resulting signal to extract the embedded message.

This message includes an object identifier. The reader uses this identifier to look up information about the object, such as its identity, and any related control instructions or functions associated with navigating around that object.

At the same time, the reader provides this information along with the orientation information to a navigation controller that uses the information to direct the vehicle around the object.

Alternative marking technologies, such as bar codes, including two-dimensional bar codes can be used to assist in navigation. However, the digital watermarking technology described in this document, has a number of advantages, including:

Computational Speed—It provides near real-time detection and identification.

Inexpensive—It uses passive low impact integration into many different environments.

Informative—It provides rotation, scale, position, distance, and identification for, marked objects.

Robust—It presents reliable detection even in harsh conditions.

Unobtrusive—It presents minimal impact on appearance of marked objects or activities around the objects.

Flexible—It provides detectable signatures for a wide range of imaging sensors.

The system may be used to mark a wide variety of objects, including vehicles and personnel. It can be integrated with systems that also rely on machine or human recognition of other navigational aids, such as machine recognition of hand signals of traffic controllers/directors, machine recognition of signs, etc. For example, signs can be watermarked, and clothing worn by traffic controllers/directors can also be watermarked. The system can be integrated with systems that use machine vision to interpret hand signals from traffic controllers/directors, such as those used at airport runways.

The digital watermark can be used to accurately measure distance, rotation, scale, and position between the sensor and marked object. In addition, it can carry a unique payload per marked object, enabling identification of the object as well as conveying other information and/or instructions. The payload can also include an index to a database entry corresponding to the object. This database can provide information that is dynamically updated over time as information about the object changes. This database can provide more complete navigation information, such as geo-spatial coordinates from Global Positioning Systems, updated maps, alternative routes that the vehicle can follow, navigation instructions, updated weather reports that may impact the travel path, location of refueling stations or other items of interest, etc.

The nature of the digital watermark makes it robust to a variety of conditions and obstacles that make it more difficult to read other types of markings. The digital watermark survives wear and tear because it can be spread redundantly throughout the surface of object, yet detected from small image excerpts of the object. It can be designed to be visible to ordinary observers, visible under certain illumination conditions, or substantially imperceptible.

The illumination may be located on the vehicle, surrounding objects, or inherent from the environment (e.g., from heat or other energy naturally radiated by the sun or other objects).

As noted above, a variety of sensors may be used in the system. Once a sensor or group of sensors is selected, one can then pick materials used to carry the marking signal that are optimized for that sensor.

To be effective as signal carriers, materials either absorb or reflect energy in the sensor spectrum to provide contrast over a digital watermark area. Furthermore, the material is selected to survive the environment of the system, including installation and durability. Finally, the material is selected and applied in such a way as to not interfere with existing surface and structure markings in the environment of the system (such as warning, general information, and directional signs).

In the specific case of sparse watermarking, the digital watermark is based on a carefully designed sparsely placed pattern of digital watermark elements. The sparseness of the pattern, and the shape and size of the elements is designed to maximize the digital watermark robustness for the desired sensor while minimizing interference with lines, arrows, signs, warnings, and any other structures or markings intended for personnel in the application environment.

Some methods by which a digital watermark pattern could be applied are by painting through a stencil, as an adhesive sheet of material, microscopic etching (chemical, laser), a layered deposit method, or others.

A digital watermarking approach may use an illumination source located on the vehicle (e.g., unmanned aerial vehicle, robot, car, truck, etc.) and digital watermark materials on surrounding structures that are either retro-reflective or completely absorptive in the sensor energy band. This arrangement would not only provide maximum contrast between an object background and the digital watermark elements, but it could also be designed to minimize contrast (and obtrusiveness) when viewed away from the source of the illumination. Such structures are commonly used in roadways and in safety vests for maximum visibility at night. Such a retro-reflective material in combination with an absorptive painted background (of the same color) would provide maximum contrast with the possibility of low obtrusiveness. Furthermore, a significant amount of development of the roadway material has already been accomplished to make them extremely durable under harsh conditions, which makes them a plausible candidate.

A particularly interesting example is the retro-reflective material used in vests that is only visible when viewed from the direction of a light source. Otherwise, the vest looks like normal material. This approach would be ideal for marking a traffic director vest where the color is already used to identify them. If the vests are already retro-reflective, then the digital watermark elements could be applied through a sparse pattern of non-reflecting elements. The advantage of marking the director's vest is that it might be used to identify a particular director for use in a hand gesture interpretation algorithm.

In designing a system for a particular application, the implementer specifies such things as:
  Sensor band to which material applies (a single material may apply to multiple sensors)
  Type of material, e.g., paint, tape, hard or soft thick coating, or even machining/etching.
  Contrast properties, i.e., reflect or absorb energy, efficiency.
  Ease and suitability of type of digital watermark application in a particular environment, e.g., adhesion, chemical danger, application methods.
  Durability in the presence of sun, rain, salt spray, wind, and wear from collision, wheels, rubbing etc.

This disclosure has provided several examples of alternative materials, sensors, and application methods that can be adapted for a variety of applications. Below, we provide additional information on a commercial system, called the Digimarc Mediabridge embedder and reader from Digimarc Corporation, that may be used to implement the digital watermark in a complete system implementation.

The Digimarc MediaBridge digital watermark includes a synchronization component and message component. The synchronization component is used to determine the rotation, scale and translation of the digital watermark and the payload signal is used to encode a message of between 20 and 60 bits. The synchronization component allows the digital watermark to be independent of rotation, scale, and translation within a range of search values defined in the detector. Once the signal is synchronized, the message can be read using error correction to recover missing sections of the digital watermark.

Due to the robustness of this digital watermark, one can apply and successfully read the digital watermark with a relatively sparse sampling of watermark elements, especially when an image is relatively smooth. This type of mark works well with environments that consist of regions of uniform colors. The uniform colors in an environment also mean that simple contrast enhancement filters can provide significant improvement of digital watermarks that consist of sparse digital watermark elements against a uniform background.

The watermarking technology has a wide range of applications across many imaging sensors including electro-optical, IR, LADAR, and others.

The digital watermark may be used in systems adapted for measuring structural defects in objects manifested by distortion of the geometry of the object. In this case, the sensor is in a fixed or known position relative to the marked object, and captures an image of the object, including the watermark, from which geometric distortion of the object can be ascertained. In particular, geometric distortion of the object due to cracks, surface defects, warping, etc. can be detected based on determining the geometric distortion of the embedded registration signal relative to a fixed or expected orientation of the registration signal. In addition, the payload of the watermark can be used to identify the object, and index related data in a database.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:
1. A method for automated navigation comprising:
  capturing an image scan of a digital watermark on an object;
  extracting orientation and location information of an image sensor relative to the object from the digital watermark;

performing object identification based on auxiliary information carried in the digital watermark; and using the orientation, location and object identification information to control movement of a vehicle.

2. The method of claim 1 wherein the digital watermark comprises a sparse digital watermark including a collection of sparse elements distributed on the object.

3. The method of claim 1 wherein the digital watermark is embedded in an image on the object.

4. The method of claim 3 wherein the digital watermark is embedded in the image by adapting a digital watermark to attributes of a host image using a human perceptual model.

5. The method of claim 1 wherein the digital watermark is carried in retro-reflective material on the object.

6. The method of claim 1 wherein the image scan is a microwave image scan.

7. The method of claim 1 wherein the image scan is an RF image scan.

8. The method of claim 1 wherein the image scan is an infrared image scan.

9. The method of claim 1 wherein the digital watermark is applied by using materials with differing cooling rates to represent elements of a digital watermark signal.

10. A computer readable medium on which is stored software for performing the method of claim 1.

11. A system for automated navigation comprising:
a sensor for capturing an image scan of a digital watermark on an object;
a reader for extracting orientation and location information of an image sensor relative to the object from the digital watermark, and for performing object identification based on auxiliary information carried in the digital watermark; and
a navigation controller for using the orientation, location and object identification information to control movement of a vehicle.

12. A method for automated machine control comprising:
capturing an image scan of a digital watermark on an object;
extracting orientation and location information of an image sensor relative to the object from the digital watermark;

performing object identification based on auxiliary information carried in the digital watermark; and using the orientation, location and object identification information to control movement of a machine.

13. The method of claim 12 wherein the digital watermark comprises a sparse digital watermark including a collection of sparse elements distributed on the object.

14. The method of claim 12 wherein the digital watermark is embedded in an image on the object.

15. The method of claim 14 wherein the digital watermark is embedded in the image by adapting a digital watermark to attributes of a host image using a human perceptual model.

16. The method of claim 12 wherein the digital watermark is carried in retro-reflective material on the object.

17. The method of claim 12 wherein the image scan is a microwave image scan.

18. The method of claim 12 wherein the image scan is an RF image scan.

19. The method of claim 12 wherein the image scan is an infrared image scan.

20. The method of claim 12 wherein the digital watermark is applied by using materials with differing cooling rates to represent elements of a digital watermark signal.

21. A computer readable medium on which is stored software for performing the method of claim 12.

22. A system for automated machine control comprising:
a sensor for capturing an image scan of a digital watermark on an object;
a reader for extracting orientation and location information of an image sensor relative to the object from the digital watermark, and for performing object identification based on auxiliary information carried in the digital watermark; and
a navigation controller for using the orientation, location and object identification information to control movement of a machine.

* * * * *